UNITED STATES PATENT OFFICE 2,074,528

PURIFICATION OF CAPRYL ALCOHOL

Chester E. Andrews, Overbrook, and Lloyd W. Covert, Philadelphia, Pa., assignors to Röhm & Haas Company, Philadelphia, Pa.

No Drawing. Application February 6, 1935, Serial No. 5,244

5 Claims. (Cl. 260—156)

This invention relates to a process for purifying capryl alcohol and particularly for eliminating any methylhexyl ketone which may be present. Capryl alcohol which is obtained as a by-product in the manufacture of sebacic acid from castor oil by fusion with caustic alkali always contains methylhexyl ketone, sometimes as much as 35%. On account of the fact that the boiling points of capryl alcohol and methylhexyl ketone lie very close together, 179.5° C. and 173° C. respectively, it is not economical to separate them by fractional distillation.

We have now found that the methylhexyl ketone in this mixture may be completely converted to capryl alcohol by hydrogenation in the presence of suitable hydrogenation catalysts. The product thus obtained is practically pure capryl alcohol and is entirely free of any ketone as shown by the well known test with a saturated solution of sodium bisulfite.

In carrying out this process we have obtained good results with a metallic nickel catalyst and have found that the catalyst prepared according to U. S. Patent 1,628,190 is very effective and permits the hydrogenation to be carried out at relatively low temperatures and pressures. This is a decided advantage since no expensive high pressure equipment is required for commercial operation. High pressures can be used if desired and naturally the rate of reduction of the ketone will be thus increased.

Any suitable hydrogenation catalyst may be used in this process, for example, oxides of hydrogenating metals with oxides of acid-forming metals with or without oxides of alkali and alkaline earth metals. A mechanical or chemical mixture of oxides of copper and chromium with or without the addition of an oxide of barium, calcium or magnesium may be employed in the process. It has also been found that copper oxide deposited on activated alumina is an effective catalyst for this process.

The invention may be illustrated by the following examples which, however, are not intended as limitations since the process may be otherwise carried out within the scope of the appended claims.

Example 1.—100 grams of technical capryl alcohol containing about 15% of methylhexyl ketone was subjected to the action of hydrogen at 125 pounds per square inch pressure and 150° C. for two hours in the presence of 6 grams of metallic nickel catalyst. The product was 100% pure capryl alcohol. The absence of ketone was shown by the test with a saturated solution of sodium bisulfite.

Example 2.—This was carried out exactly as in Example 1, except that the pressure was 3,000 pounds per square inch. The product was 100% pure capryl alcohol.

Example 3.—80 grams of crude capryl alcohol, containing about 20% of methylhexyl ketone, were subjected to hydrogenation, using 4 grams of a finely divided copper oxide-chromium oxide-barium oxide catalyst in an agitated autoclave at 200° C. and 2,000 pounds per square inch hydrogen pressure. The hydrogenation was complete in 20 minutes, and the product was 100% capryl alcohol. The absence of ketone in the product was shown by the test with saturated sodium bisulfite solution.

Example 4.—80 grams of methylhexyl ketone were completely reduced to capryl alcohol in 0.5 hour at 200° C. and 2,000 pounds per square inch hydrogen pressure, in the presence of 6 grams of catalyst made by grinding intimately 50 grams of copper nitrate in 25 cc. of water with 50 grams of 180 mesh activated alumina, drying, and heating for four hours at 600° C. in an electric furnace. The hydrogenation was carried out in a suitable agitated autoclave.

The process may also be carried out in a continuous flow system, either in the liquid or vapor phase.

The product may sometimes contain a small amount of high boiling material of the di-capryl series which is readily separated from the pure capryl alcohol by distillation.

The process hereinbefore described can also be used for the hydrogenation of methylhexyl ketone in mixtures other than those described, and can also be used to convert methylhexyl ketone to capryl alcohol when no mixtures are involved.

It is understood that this process must be carried out under suitable conditions of temperature, hydrogen pressure, proportion of catalyst, and time with any particular catalyst. It is well known to those skilled in the art that severe conditions may result in the conversion of the capryl alcohol to corresponding hydrocarbon and these conditions must be avoided.

We claim:

1. The process of preparing substantially pure capryl alcohol from mixtures containing capryl alcohol and methyl hexyl ketone, comprising the conversion of the methyl hexyl ketone contained in the mixture to capryl alcohol by catalytic hydrogenation at pressures of from 125 to 3,000 lbs.

per square inch and temperatures of from 150° to 200° C.

2. The process of preparing substantially pure capryl alcohol from mixtures containing capryl alcohol and methyl hexyl ketone, comprising the conversion of the methyl hexyl ketone contained in the mixture to capryl alcohol by catalytic hydrogenation, in the presence of a nickel catalyst at pressures of from 125 to 3,000 lbs. per square inch and temperatures of from 150° to 200° C.

3. The process of preparing substantially pure capryl alcohol from mixtures containing capryl alcohol and methyl hexyl ketone, comprising the conversion of the methyl hexyl ketone contained in the mixture to capryl alcohol by catalytic hydrogenation, in the presence of a nickel catalyst at a temperature of substantially 150° C. and a pressure of substantially 125 pounds per square inch.

4. The process of preparing substantially pure capryl alcohol from mixtures containing capryl alcohol and methyl hexyl ketone, comprising the conversion of the methyl hexyl ketone contained in the mixture to capryl alcohol by catalytic hydrogenation, in the presence of a copper-oxide-chromium oxide catalyst at pressures of from 125 to 3,000 lbs. per square inch and temperatures of from 150° to 200° C.

5. The process of preparing substantially pure capryl alcohol from mixtures containing capryl alcohol and methyl hexyl ketone, comprising the conversion of the methyl hexyl ketone contained in the mixture to capryl alcohol by catalytic hydrogenation, in the presence of a catalyst consisting of copper oxide supported on activated alumina at pressures of from 125 to 3,000 lbs. per square inch and temperatures of from 150° to 200° C.

CHESTER E. ANDREWS.
LLOYD W. COVERT.